United States Patent [19]

Lock

[11] 4,357,823

[45] Nov. 9, 1982

[54] STRAIN GAUGE SIMULATOR

[75] Inventor: Alan H. Lock, Allestree, England

[73] Assignee: Rolls-Royce Limited, London, England

[21] Appl. No.: 249,979

[22] Filed: Apr. 1, 1981

[30] Foreign Application Priority Data

Jun. 19, 1980 [GB] United Kingdom ................. 8020135

[51] Int. Cl.³ ................................................ G01L 25/00

[52] U.S. Cl. .................................. 73/1 B; 73/432 SD

[58] Field of Search ........... 73/1 B, 1 R, 765, 432 SD

[56] References Cited

U.S. PATENT DOCUMENTS 3,203,223 8/1965 Petrow .................................. 73/1 B 4,293,916 8/1981 Del Re et al. ..................... 73/1 R X

*Primary Examiner*—Jerry W. Myracle

*Attorney, Agent, or Firm*—Cushman, Darby & Cushman

[57] ABSTRACT

In order to facilitate the accurate calibration of a strain gauge amplifier, an electrical circuit is provided, the output of which simulates the output of a strain gauge. A given polarizing current which is the same as that normally applied to the strain gauge is applied to the electrical circuit. Additional, circuitry is provided for producing a single electrical output equivalent to that of the strain gauge.

4 Claims, 1 Drawing Figure

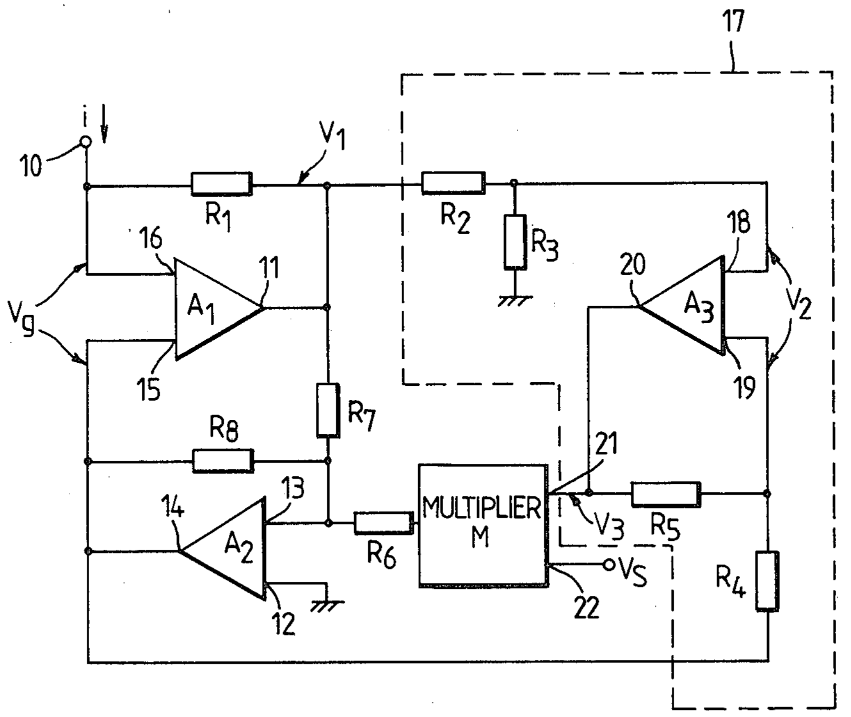
17
i
10
V1
R1
R2
R3
16
11
18
20
A1
A3
Vg
V2
15
19
R7
R8
21
13
MULTIPLIER
M
14
A2
R6
V3
R5
VS
R4
12
22

STRAIN GAUGE SIMULATOR

This invention relates to an electrical circuit, so adapted that its output simulates the output of a strain gauge.

Strain gauges are well known devices which utilize the change in electrical resistance of a wire under stress to facilitate the measurement of strain or pressure.

The strain gauge converts a mechanical motion to a change in the electrical resistance of a wire by virtue of the fact that when a wire is stretched, its length is increased and its diameter decreased. This in turn results in an increase in the electrical resistance of the wire. Conversely if the wire is compressed, its electrical resistance is decreased. Thus if the wire, which may conventionally be of sinuous form, is fixed to the surface of a component, deformation of that component will result in corresponding deformation, and hence a resistance change, in the strain gauge. If that component is a pressure vessel, then deformation of the vessel as a result of pressure changes within it will result in corresponding resistance changes in the strain gauge. In both cases, the changes in strain gauge resistance are proportional to the degree of strain in the component or the pressure within the pressure vessel.

It is necessary to apply a polarizing voltage to a strain gauge in order to determine in its resistance. Such resistance changes are however very small and hence it is usually necessary to amplify the strain gauge output in order that the amount of resistance change, and hence the degree of component deformation, may be accurately determined. However amplifiers intended to achieve this end must be calibrated. This has been done in the past by attaching a strain gauge to a cantilever, vibrating the cantilever at appropriate known amplitudes and frequencies, amplifying the output of the strain gauge and suitably calibrating the amplifier in accordance with the oscillation amplitudes and frequencies of the cantilever.

Such a method is not, however, particularly accurate as a result of difficulties in determining the amplitude of vibration of the cantilever and indeed variability between the outputs of individual strain gauges.

It is an object of the present invention to provide an electrical circuit so adapted that its output simulates that of a strain gauge, whereby that output is suitable for use in the calibration of a strain gauge amplifier.

According to the present invention, an electrical circuit is so adapted that for the application of a given polarizing current thereto, the electrical output thereof is equivalent to the electrical output of a given strain gauge to which the same polarizing current has been applied, said circuit comprising means adapted to provide an electrical output equivalent to that of said strain gauge in a non-deformed condition, means adapted to provide an electrical output equivalent to the differences between the electrical outputs of strain gauge in deformed and non-deformed conditions and means adapted to combine said electrical outputs to provide a single electrical output equivalent to that of said strain gauge.

Said means adapted to provide an electrical output equivalent to that of said strain gauge in a non-uniform condition preferably comprises in combination an operational amplifier, a feedback operational amplifier and a resistor network so arranged that said operational amplifier absorbs said polarizing current and said feedback amplifier develops a voltage output equivalent to that of said strain gauge in a non-deformed condition.

Said means adapted to provide an electrical output equivalent to the difference between the electrical outputs of said strain gauge in deformed and non-deformed conditions preferably comprises a differential amplifier adapted to receive the voltage developed between an input and the output of said operational amplifier arranged to absorb said polarizing current and a multiplier adapted to receive both the output of said differential amplifier and an additional input voltage, said input voltage being of such a magnitude that the output of said multiplier is proportional to said difference between the electrical outputs of said strain gauge in deformed and non-deformed conditions.

The output of said multiplier is preferably fed to one input of said feedback operational amplifier.

The invention will now be described with reference to the accompanying drawing which depicts a diagram of an electrical circuit in accordance with the present invention.

With reference to the circuit diagram, a polarizing current i is applied to the circuit at 10. The current passes through a resistor $R_1$ to the output 11 of an operational amplifier $A_1$ where it is absorbed. A feedback operational amplifier $A_2$ has one of its inputs 12 connected to earth while the other 13 is connected to the output 11 of the amplifier $A_1$ via a resistor $R_7$. The output 14 of the amplifier $A_2$ is connected to one of the inputs 15 of the amplifier $A_1$ while the other input 16 of the amplifier $A_1$ is connected to the point of application of the polarizing current i. The output 14 of the amplifier $A_2$ is interconnected with the input 13 of the amplifier $A_2$ via a resistor $R_8$.

The inputs 15 and 16 of the amplifier $A_1$ equalize at a voltage Vg, the voltage being defined by the resistor $R_1$ and the amplifier $A_2$. The voltage Vg is of such a value that it represents the output of a strain gauge in a non-deformed condition.

Simulation of the change in output of a strain gauge resulting from changes in its resistance as it is deformed is achieved by modulating the voltage Vg. More specifically the voltage developed across $R_1$ is multiplied by the required modulation and added in the amplifier $A_2$, thereby modulating the voltage Vg.

The voltage at the output 11 of the amplifier $A_1$ is $V_1$ and consequently the voltage developed across the resistor $R_1$ is Vg-$V_1$ (this being a function of i and $R_1$ only). This voltage Vg-$V_1$ is applied to a differential amplifier 17 which is defined by an operational amplifier $A_3$ and resistors $R_2$, $R_3$, $R_4$ and $R_5$. Thus the resistor $R_1$ is connected to one input 18 of the amplifier $A_3$ via the resistor $R_2$, the input 18 being connected to earth via the resistor $R_3$. The other input 19 of the amplifier $A_3$ is connected to its output 20 via the resistor $R_5$ and to the output 14 of the amplifier $A_2$ via the resistor $R_4$. The resistor $R_4$ is connected to the amplifier $A_2$ in order to prevent errors due to the loading of resistor $R_4$ on the input current i.

The voltage $V_3$ at the output 20 of the amplifier $A_3$ is applied to one input 21 of a multiplier M. A voltage $V_s$ is applied to the other multiplier input 22. The output of the multiplier, that is $V_3V_s$, is then fed to the input 13 of the amplifier $A_2$ via a resistor $R_6$.

This serves to modulate the voltage Vg by an amount which is proportional to the magnitude of voltage $V_s$.

Thus the voltage $V_s$ is proportional to the degree of modulation which is made to the voltage Vg in order for voltage Vg to simulate the output of a deformed strain gauge.

The theory behind the aforementioned circuit may be expressed as follows:

$$V_1 = V_g - iR_1 \qquad (1)$$

now if the voltage at the inputs of the amplifier $A_3$ is termed $V_2$ then $$V_2 = V_1 \frac{R_3}{R_2 + R_3} \qquad (2)$$

At the inverting input of the amplifier $A_2$ $$\frac{V_g - V_2}{R_4} = \frac{V_2 - V_3}{R_5}$$

$$V_3 = \frac{-R_5}{R_4}(V_g - V_2) + V_2 = V_2\left(1 + \frac{R_5}{R_4}\right) - V_g\frac{R_5}{R_4}$$

Substitute for $V_2$ from (2)

$$V_3 = V_1 \frac{R_3}{R_2 + R_3}\left(1 + \frac{R_5}{R_4}\right) - V_g\frac{R_5}{R_4} \qquad (3)$$

$$V_g = V_1\frac{R_8}{R_7} - \frac{R_8}{R_6} V_s V_3 \text{ (output of amplifier } A_2\text{)}$$

Substitute for $V_3$ from (3)

$$V_g = - V_1\frac{R_8}{R_7} - V_s\frac{R_8}{R_6}\left[\frac{R_3}{R_2 + R_3}\left(1 + \frac{R_5}{R_4}\right) - V_g\frac{R_5}{R_4}\right]$$

Substitute for $V_1$ from (1)

$$V_g = (iR_1 - V_g)\frac{R_8}{R_7} - V_s\frac{R_8}{R_6}\left[(V_g - iR_1)\frac{R_3}{R_2 + R_3}\left(1 + \frac{R_5}{R_4}\right) - V_g\frac{R_5}{R_4}\right] \qquad (4)$$

$$V_g\left[1 + \frac{R_8}{R_7} + V_s\frac{R_8}{R_6}\left(\frac{R_3}{R_2 + R_3}\left[1 + \frac{R_5}{R_4}\right] - \frac{R_5}{R_4}\right)\right] = iR_1\left[\frac{R_8}{R_7} + V_s\frac{R_8}{R_6}\ \frac{R_3}{R_2 + R_3}\left(1 + \frac{R_5}{R_4}\right)\right]$$

To eliminate the $V_s V_g$ term $$O = \frac{R_3}{R_2 + R_3}\left(1 + \frac{R_5}{R_4}\right) - \frac{R_5}{R_4} \qquad (5)$$

$$\text{i.e. } \frac{R_2}{R_3} = \frac{R_4}{R_5}$$

Substitute for $R_5$ from (5) into (4)

$$V_g\left(1 + \frac{R_8}{R_7}\right) =$$

-continued $$iR_1\left[\frac{R_8}{R_7} + V_s\frac{R_8}{R_6}\ \frac{R_3}{R_2 + R_3}\left(1 + \frac{R_3}{R_2}\right)\right]$$

$$V_g = iR_1\frac{R_8}{R_7 + R_8}\left(1 + V_g\frac{R_3R_7}{R_2R_6}\right)$$

If Rg = the resistance of the strain gauge simulated by the circuit and δ = the required modulation $$\text{Let } R_g = \frac{R_8}{R_7 + R_8} R_1 \qquad (6)$$

$$= \frac{R_3R_7}{R_2R_6} V_s$$

$$\text{Then } V_g = iR_g(1 + \delta)$$

When the strain gauge simulated by the aforementioned circuit is required to be non-deformed then the voltage $V_s$ applied to the multiplier M is 0. This being so δ=0 and consequently from (6) above Vg=iRg. However if $V_s \neq 0$ then Vg will equal iRg plus a voltage which is proportional to $V_s$.

It will be seen therefore that by varying $V_s$, the output voltage Vg of the circuit will vary in the same manner as the output voltage of a strain gauge which is variously deformed and to which the same polarizing i is applied. This being so, the output voltage Vg may be used in the calibration of a strain gauge amplifier.

I claim:

1. An electrical circuit so adapted that for the application of a given polarizing current thereto, the electrical output thereof is equivalent to the electrical output of a given strain gauge to which the same polarizing current has been applied, said circuit comprising means adapted to provide an electrical output equivalent to that of said strain gauge in a non-deformed condition, means adapted to provide an electrical output equivalent to the difference between the electrical outputs of said strain gauge in deformed and non-deformed conditions and means adapted to combine said electrical outputs to provide a single electrical output equivalent to that of said strain gauge.

2. An electrical circuit as claimed in claim 1 wherein said means adapted to provide an electrical output equivalent to that of said strain gauge in a non-deformed condition comprises, in combination, an operational amplifier, a feedback operational amplifier and a resistor network so arranged that said operational amplifier absorbs said polarizing current and said feedback amplifier develops a voltage output equivalent to that of said strain gauge in a non-deformed condition.

3. An electrical circuit as claimed in claim 2 wherein said means adapted to provide an electrical output equivalent to the difference between the electrical outputs of said strain gauge in deformed and non-deformed conditions comprises a differential amplifier adapted to receive the voltage developed between an input and the output of said operational amplifier arranged to absorb said polarizing current, and a multiplier adapted to receive both the output of said differential amplifier and an additional input voltage, said input voltage being of such a magnitude that the output of said multiplier is proportional to the difference between the electrical outputs of said strain gauge in deformed and non-deformed conditions.

4. An electrical circuit as claimed in claim 3 wherein the output of said multiplier is fed to one output of said feedback operational amplifier.

* * * * *